(No Model.)

A. W. THOMPSON.
CORN CUTTING MOWER AND REAPER ATTACHMENT.

No. 365,653. Patented June 28, 1887.

WITNESSES:
Fred G. Dieterich
John C. Kennon

INVENTOR:
A. W. Thompson
BY Munn & Co.
ATTORNEYS.

United States Patent Office.

AMOS WILKINSON THOMPSON, OF BURLINGTON, IOWA.

CORN-CUTTING MOWER AND REAPER ATTACHMENT.

SPECIFICATION forming part of Letters Patent No. 365,653, dated June 28, 1887.

Application filed July 9, 1886. Serial No. 207,605. (No model.)

*To all whom it may concern:*

Be it known that I, AMOS WILKINSON THOMPSON, of Burlington, in the county of Des Moines and State of Iowa, have invented a new and useful Improvement in Corn-Cutting Mower and Reaper Attachments, of which the following is a specification.

My invention consists in an improved reaper and mower attachment for cutting corn and cane, which may be attached in operative position to any reaper or mower of usual construction, and which will be hereinafter fully described and claimed.

Figure 1:
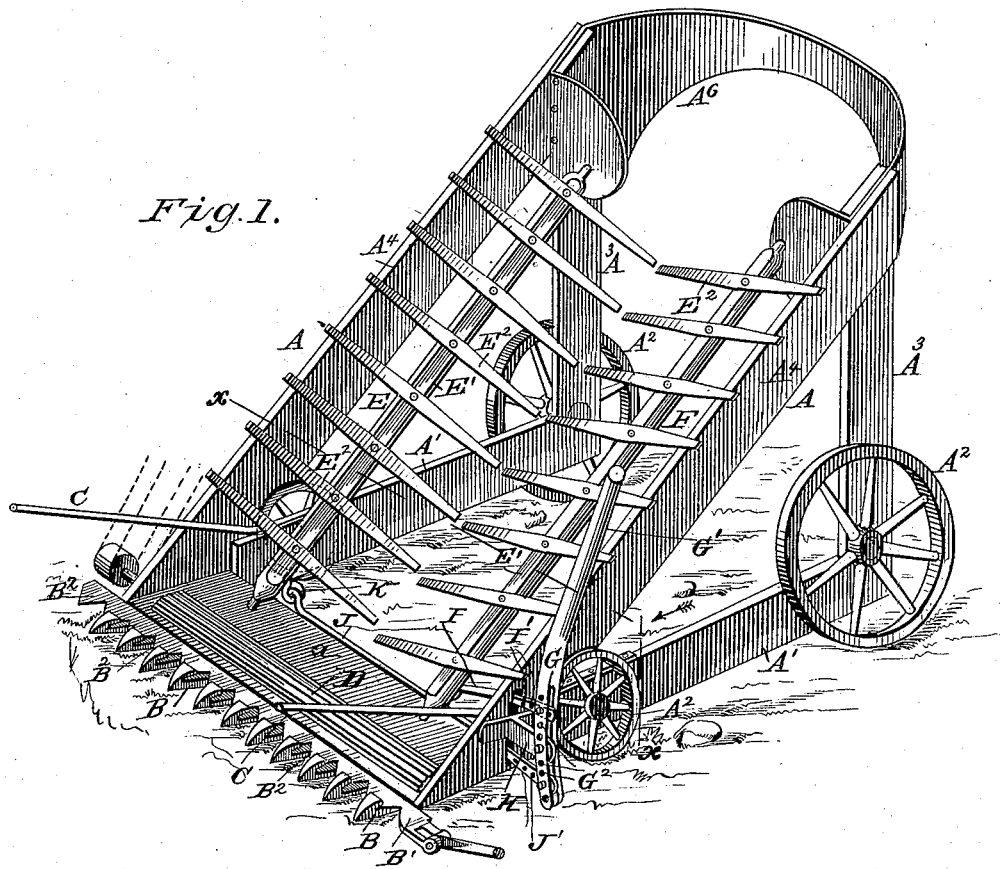
Figure 2:
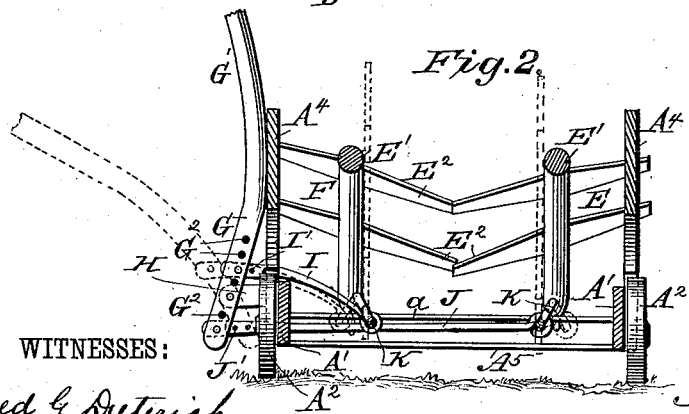

Referring to the accompanying drawings, Figure 1 is a perspective view of my invention; and Fig. 2 is a cross sectional view taken on line *x x*, Fig. 1.

The same letters of reference indicate corresponding parts in both the figures.

Referring to the several parts by letter, A A represent the frame of my improved attachment, which consists of the longitudinal base-pieces A', which are mounted on the wheels A², the rear uprights, A³, and the rearwardly and upwardly inclined braces A⁴, the side frames thus composed being connected by the lower frame-piece, A⁵, at their front ends, and the upper rear curved brace, A⁶, which connects the upper ends of the uprights A³ together, as shown. To the forward lower end of the frame is secured the cutting apparatus, which consists of the usual fingers, B, and cutter-bar B', carrying the blades or knives B², the cutter-bar being reciprocated in the usual manner by the drive mechanism of the reaper or mower to which the attachment is at the time secured. The cutting apparatus is of sufficient width to cut two rows of corn or cane at once. The forward end of the frame is provided with the ordinary guides, C C. Immediately to the rear of the cutting apparatus is journaled the roller D, which is formed with the corrugated or serrated surface, and is arranged so that it is flush with the plate *a*, beneath which it is journaled. This corrugated roller is adapted to be revolved through a belt or chain from the reaper or mower, and serves to feed the cut corn or cane back and up on the two adjustable inclined trays E F. These trays consist each of a rod or shaft, E', inclined parallel with the upper side pieces of the frame and journaled or pivoted at its upper and lower ends in bearings of the main frame, as shown, the said two shafts being parallel to each other and having secured on them by their middle portions a series of transverse parallel cross-pieces, E², which, when the shafts are in their normal position, rest with their outer ends upon the upper edges of the inclined side pieces of the frames and have their inner ends in close proximity, so as to prevent the stalks resting upon them from falling through until a sufficient quantity of the same has accumulated.

G represents a centrally-pivoted lever, which has the operating-handle G', and which is centrally pivoted on a bearing, H, on one side of the main frame of the attachment, and is formed both above and below its pivotal point with a vertical series of apertures, G², and in the upper portion of this lever is adjustably pivoted the outer end of a short coupling-rod, I, the outer end of which is also formed with a series of transverse apertures, I', and in the lower portion of the lever is adjustably pivoted the outer end of a longer coupling-rod, J, the outer end of which is also formed with a series of transverse apertures, J'. The lever G normally stands in a vertical position, and the inner end of the short coupling-rod I is hinged in an eye, K, on the under side of the axle nearest to the lever, while the inner end of the longer coupling-rod, J, is hinged in a like manner to a similar eye K on the under side of the axle farthest away from the lever; and it will be seen that the result of this arrangement is that when the handle of the lever is drawn out and down, as shown in dotted lines in Fig. 2, the axles are turned so that their cross-pieces stand in vertical planes parallel to each other, both axles turning inward, so as to drop the corn or cane cut from two rows into one heap upon the ground between the rows immediately under the central line of the attachment.

From the foregoing description, taken in connection with the accompanying drawings, the construction, operation, and advantages of my improved reaper and mower attachment for cutting corn and cane will be readily understood. It will be seen that it may be attached in operative position to any ordinary reaper or mower; that the platforms or frames are inclined so as to receive the cut corn or cane at a suitable angle to drop it immediately beneath them between the rows, and that one movement of the single lever revolves and discharges both of the receiving platforms or trays. The corrugated roller serves to feed the stalks up clear of the cutting apparatus well onto the platforms or trays. The whole attachment is simple and strong in construction, is therefore not liable to break or get out of order, and is exceedingly efficient in its operation.

Having thus described my invention, what I claim, and desire to secure by Letters Patent, is—

1. In a mower and reaper attachment, the combination, with an inclined main frame having a cutting apparatus at its lower front edge, of the inclined trays E F, consisting of the inclined shafts E', provided with the cross-pieces E², having their outer ends resting upon the inclined side pieces of the main frame, the lever G, pivoted to the frame, and the coupling-rods I J, connected to the said lever and shafts, substantially as herein shown and described.

2. A mower and reaper attachment consisting of the inclined frame A, mounted on the wheels A² and having a cutting apparatus at its lower front end, the corrugated roller D, journaled in the frame in rear of the cutting apparatus, the inclined shafts E', journaled in the frame A and provided with the cross-pieces E², having their outer ends resting upon the side pieces of the frame A, the lever G, pivoted to the frame, and the coupling-rods I J, adjustably connected, respectively, to the said lever above and below its pivot, substantially as herein shown and described.

AMOS WILKINSON THOMPSON.

Witnesses:
J. T. CHAPLEN,
F. B. OBER.